United States Patent [19]
Tullis

[11] 3,781,624
[45] Dec. 25, 1973

[54] LIQUID LEVEL INDICATOR AND FLOW MEASURING DEVICE

[75] Inventor: Reuben C. Tullis, San Diego, Calif.

[73] Assignee: Manning Environmental Corp., Santa Cruz, Calif.

[22] Filed: Dec. 21, 1970

[21] Appl. No.: 100,049

Related U.S. Application Data

[63] Continuation-in-part of Ser. No. 817,369, April 18, 1969, abandoned.

[52] U.S. Cl.................. 318/482, 33/126.6, 73/321, 73/313
[51] Int. Cl.......................... G01f 23/10, H02p 3/00
[58] Field of Search.................. 73/321, 304 R, 312, 73/217, 227; 33/126.6; 318/482

[56] References Cited
UNITED STATES PATENTS

| | | | |
|---|---|---|---|
| 3,124,000 | 3/1964 | Melas | 73/215 |
| 3,400,462 | 9/1968 | Pobst, Jr. | 73/321 |
| 2,627,660 | 2/1953 | Smith | 33/126.6 |
| 3,473,380 | 10/1969 | Mayer et al. | 73/304 |
| 2,682,026 | 6/1954 | Mesh et al. | 318/482 X |
| 3,100,347 | 8/1963 | Fritze | 33/126.6 |

FOREIGN PATENTS OR APPLICATIONS
1,088,196  9/1954  France ........................... 3/126.6

Primary Examiner—Richard C. Queisser
Assistant Examiner—Daniel M. Yasich
Attorney—Gregg, Hendricson & Caplan

[57] ABSTRACT

A portable device is provided for mounting above a conduit or trench adapted to contain a moving liquid, such as water, sewage, and the like, and to rapidly and effectively measure and record the depth of flow. Such measurement may relate only to liquid level depth or, alternatively, may be employed in accordance with Manning's Formula to provide a recorded indication of volume of flow. A weighted electrically conductive probe is automatically reeled out upon a cable from a measuring and recording device, so as to locate the upper level of electrically conductive liquid flowing beneath the device, and upon command such probe also locates the invert of the conduit or bottom level of the liquid. A particular probe design is provided for location of the upper level of flowing liquid, particularly under circumstances wherein such level may rapidly vary and, furthermore, the invention is adapted to accommodate circumstances wherein no liquid is present in the conduit or trench above which same is mounted.

7 Claims, 6 Drawing Figures

PATENTED DEC 25 1973 3,781,624
SHEET 1 OF 2
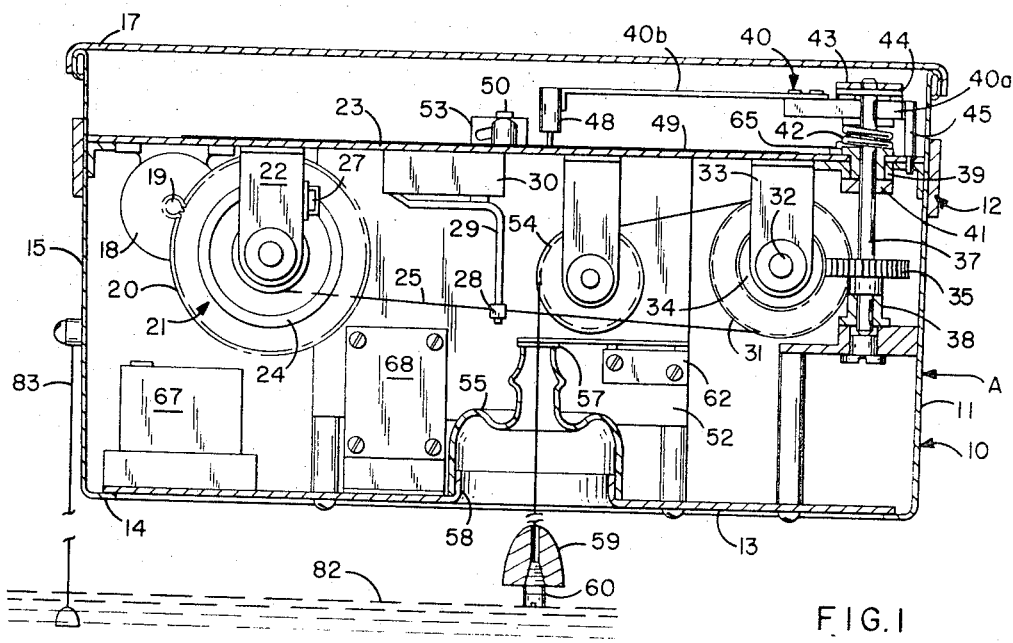
FIG. 1
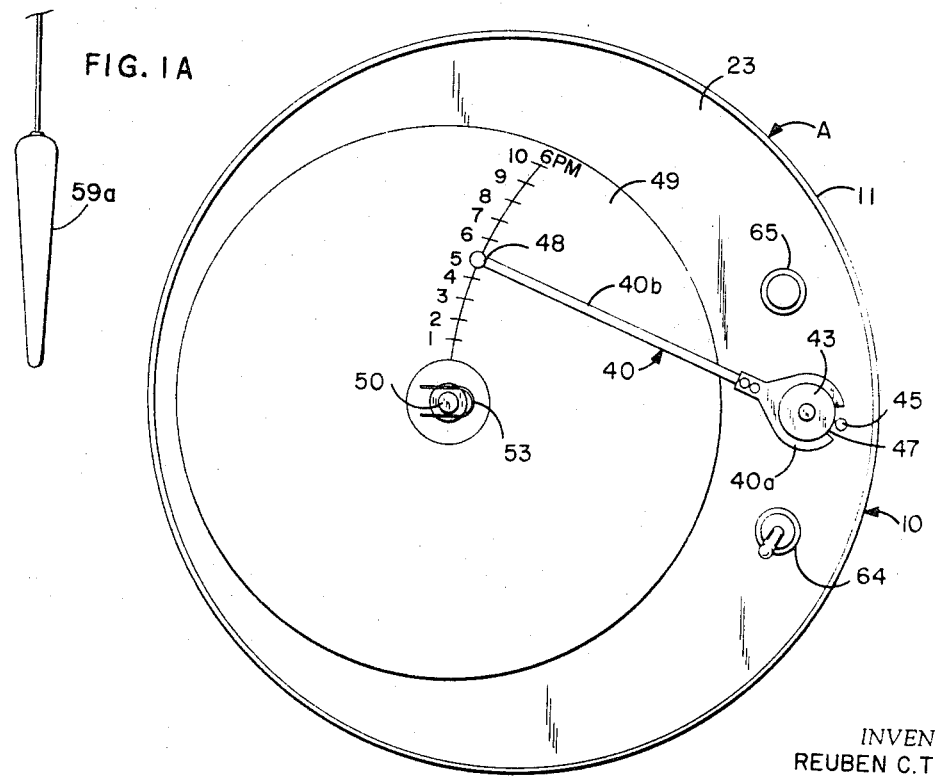
FIG. 1A
FIG. 2
INVENTOR.
REUBEN C. TULLIS
ATTORNEY

INVENTOR.
REUBEN C. TULLIS

ATTORNEY

LIQUID LEVEL INDICATOR AND FLOW MEASURING DEVICE

The present application is a continuation-in-part of copending U.S. application Ser. No. 817,369, filed Apr. 18, 1969, for "Liquid Level Indicator and Recorder", and now abandoned.

BACKGROUND OF INVENTION

There have been developed numerous devices and instruments for locating the level of liquid in tanks, and the like. In this respect reference is made, for example, to U.S. Pat. Nos. 2,354,945, 2,383,516, 2,682,026, 2,698,539, 2,704,342 and 3,100,347. Such prior art is exemplary of liquid level location in closed containers, such as tanks employed in the petroleum industry and the like.

Prior art in this general field provides much teaching with relation to various types of probe and indicating circuitry and the like for the location of the upper level of liquid. The prior art is, however, primarily directed to liquid level indication in fixed containers, although it is noted that a more recent U.S. Pat. No. 3,473,380 is directed to apparatus employing a capacitive probe device for determining the upper and lower level of petroleum or the like in underground caverns. With regard to the wide field of liquid flow, particularly as regards sewage flow or drain-off flow from floods, or the like, wherein the flowing liquid contains a wide variety of different types of solid matter, it appears that little effort has been expended toward practical devices in such field. Although the general area of liquid level indication has been rather thoroughly covered in the prior art, the application of liquid level indication to flow measurement differs sufficiently therefrom to pose many additional requirements not provided by prior-art devices. Thus, for example, prior-art devices adapted to enter liquid as, for example, to locate the invert or bottom of a channel or the like wherein same are located, are not adapted to accommodate rapid variations in liquid level. It will be appreciated that any type of probe, such as generally known prior-art liquid level indicating probes, adapted to hunt or move back-and-forth upon the level of liquid are only adapted to accommodate slow variations in such level. Alternative circumstances wherein the level may rapidly vary by a number of feet, for example, would then result in the application of a lateral force to the probe by any rapid rise of the liquid level, wherein such liquid is moving laterally of the measuring device and this would then tend to produce wholly erroneous indications of liquid level.

There exists a large field of application for liquid level indicators, wherein the liquid is variable in depth from a zero depth to many feet, and wherein such variation may occur quite rapidly. Not only does the level vary but, furthermore, the liquid to be measured is flowing rapidly through a conduit, trench, or the like, such that the measuring instrument must then be capable of measuring zero liquid depth without erroneous recording or damage to the device thereof, and at the same time must be capable of measuring rapidly varying liquid levels. The foregoing is accomplished by the present invention, which is particularly directed to measurement of the top level and bottom level or invert of flowing liquid, such that the invention has wide applicability in the general field of liquid level indication and, more particularly, is specifically adapted to measure the flow of liquid in an open or closed conduit.

SUMMARY OF INVENTION

The present invention comprises a small portable device having a weighted, electrically conductive probe carried by a cable upon a reel within the device and adapted to be lowered from the device either for location of the upper level of an electrically conductive liquid, or at command to pass through the liquid for location of the bottom level of such liquid as measured from the location of the device itself. More particularly, the present invention comprises a small, self-contained unit that is wholly watertight, together with mounting means for location of such unit or device above flowing liquid whose level or levels are to be measured. The device contains a recorder for providing a time graph of liquid level measured by the probe of the device.

Particularly with regard to the measurement of the flow of liquids and the flow of liquids containing solids, such as, for example, the flow of sewage, the output of chemical processing plants or the flow of water drainage and debris from rainstorms and the like, it is known that conventional flow measuring devices are wholly inapplicable. It is conventional to employ some type of weir, wet sump, or flow-through devices for determining the volume of liquid flow in conduits and the like. All of these conventional approaches are subject to major errors and, in fact, complete failure under those conditions wherein solids are included in the liquid flow. Although the present invention is applicable to any type of liquid level indication, it is particularly advantageous in the field of liquid flow measurement for the presence of solids in the flowing liquid have substantially no effect upon the present invention and, furthermore, rapid variations in the level of flow are readily followed by this invention.

DESCRIPTION OF FIGURES

The present invention is illustrated as to particular preferred embodiments thereof in the accompanying drawings wherein:

FIG. 1 is a side elevational view of a mechanism embodying the present invention and having the side of the housing removed to illustrate internal components;

FIG. 1A is a side elevational view of an alternative configuration of a probe as may be employed in the mechanism of FIG. 1;

FIG. 2 is a top plan view of the mechanism of FIG. 1 with the cover removed;

DESCRIPTION OF PREFERRED EMBODIMENTS

Figure 3:
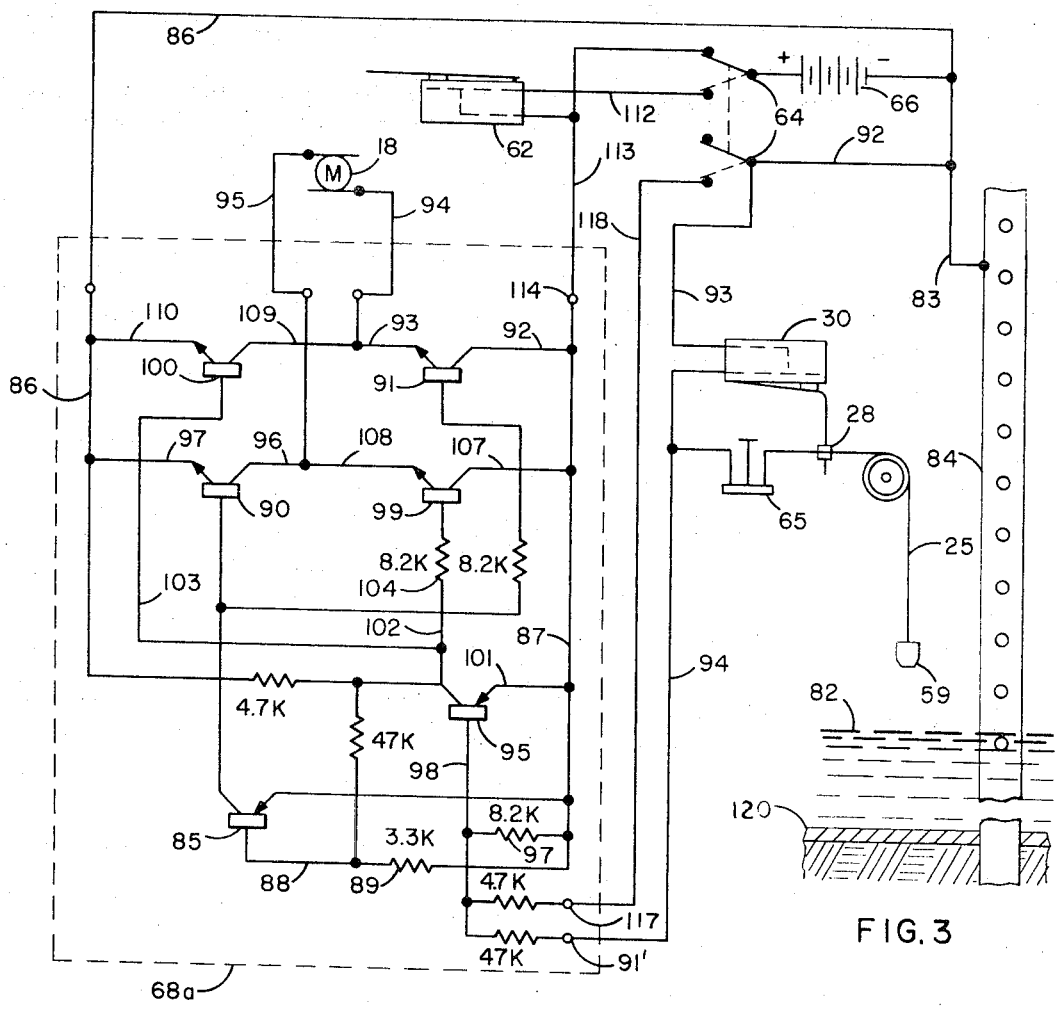
FIG. 3 is a schematic circuit diagram illustrating a solid-state motor actuating module and associated electrical circuit elements of the mechanism of FIG. 1 and including relationship of certain of the elements to physical surroundings in use of the mechanism.

Referring to FIG. 1, the specific embodiment of the invention illustrated comprises a water level and depth measuring and recording instrument A comprising a mechanism 10 mounted in a housing 11 and removably mounted in a supporting frame 12. The housing 11 comprises a circular sheet metal bottom plate 13 which rests upon the inturned bottom flange 14 of a circular housing wall 15. A removable housing cover 17 is sealed to the housing to form a watertight enclosure for full protection of the mechanism therein. It is particularly noted that for some applications of the invention, as in storm drains and the like, water may rise over the top of the device and thus it is important that the housing be truly watertight. All parts of the mechanism 10 and its housing 11 preferably are of corrosion resistant material and the mechanism 10 is so mounted that it can be lifted out as a single assembly with the bottom plate 13 for inspection and servicing. The mechanism 10 is a reversible, direct current, electric motor 18, the shaft of which is provided with a drive pinion 19 in mesh with a ring gear 20 secured coaxially to one flange of a reel 21 journaled in bearings support 22 depending from a top plate 23. Also mounted coaxially on the reel 21 is a slip ring 24 which is in electrical contact with the inner end of a wire cable 25 wound on the reel 21. A contact brush 27 rides on the slip ring 24 for electrical connection of the cable 25 into a motor control circuit illustrated in FIG. 3, to be described in more detail hereinafter.

From the reel 21 the cable 25, which preferably is of nylon sheathed stainless steel, passes through an eyelet 28 of low frictional resistance material, such as Teflon, mounted on the free end of the actuating arm 29 of a normally closed, slack-sensing micro-switch 30. From the eyelet 28, the cable 25 passes around a grooved pulley 31 that is secured coaxially on a shaft 32 that is journaled in bearings support 33 for rotation by the cable 25. A worm drive pinion 34 is also secured coaxially to the shaft 32 and is in mesh with a worm gear 35 secured coaxially to an upright recording arm support shaft 37.

The upright shaft 37 is journaled in bearings 38 and 39, and the hub portion 40a of a recording arm 40 is mounted on the upper end portion of this shaft, and in frictionally driven relation therewith. To attain this frictionally driven relation, a collar 41 is secured to the support shaft 37 and a coil spring 42 is held in compression between this collar and the hub portion 40a of the recording arm 40. The upper face of the hub portion 40a is flat, and bears against the flat underside of a friction washer 43, which is secured to the shaft 37 by a through pin 44. The washer 43 is of a material, such as automotive brake material, having a coefficient of friction sufficiently high to drive the recording arm 40, but sufficiently low to permit said arm to be swung manually to adjusted position. Swinging movement of the support arm 40 is limited by a stop pin 45 secured to the top plate 23, see FIGS. 1 and 2, and riding in a sequential cut-out 47, see FIG. 2, in a marginally extending portion of the hub portion 40a. An outer recording arm portion 40b, of light spring material is mounted on the hub portion 40a to extend radially therefrom, and a conventional recording stylus or pen 48 is mounted on its outer or free end. The foregoing structure comprises clutch means connecting the recorder arm and reel with stop means at recorder zero whereby the recorder arm moves to zero reading as the cable unreels and remains there by clutch slipping until the reel reverses direction.

The stylus 48 rides on a conventional circular chart 49 which is mounted on a hub member 50 secured to the shaft of a conventional clockworks 52. The chart 49 is of a well known type used to record time distance data and is clamped to the hub 50 by a U-clip 53 in a well known manner. The clockworks 52 may be selected to rotate the chart 49 at any desired rate of speed, depending upon the nature of the tests to be performed for example, one revolution per 24 hours, per week, or other time interval as required.

Returning now to the cable 25, see FIG. 1, from the grooved recording arm drive pulley 31, the cable 25 passes over a grooved idler pulley 54 and thence depends by gravity and passes coaxially through a flexible rubber seal 55 having a stiff washer 57 of suitable material, such as hard fiber, mounted thereon. The seal 55 is fitted over an upstanding circular flange 58 provided around a hole in the bottom plate 13.

A contact probe 59 is mounted on the lower end of the cable 25 and consists of a streamlined metal weight with an axial bore to receive the cable 25. The lower end of the bore is threaded and a threaded insert 60 of electrically conductive metal, such as bronze, is screwed therein. The insert 60 has an axial bore into which the lower end of the cable 25, stripped of its insulative sheath, is inserted and secured in electrically conductive relation as by soldering. At least the lower tip of the insert 60 is of highly non-corrosive metal, such as platinum, which may be applied by electroplating.

An alternatively shaped probe 59a illustrated in FIG. 1A is particularly adapted for use in measuring liquid levels wherein the level is subject to rapid and substantial fluctuations and wherein the liquid may include solids. The probe 59a is formed as a narrow elongated rod, as shown, with a taper inwardly from top to bottom. The lower end of the probe is preferably not pointed but instead is at least slightly rounded. The probe 59a is preferably formed of a corrosion resistant metal such as monel, and may thus also comprise the weight required for lowering the probe, particularly through liquid. When the level of flowing liquid rises rapidly, the liquid exerts a force on the side of the probe and use of a thin elongated probe minimizes this force so that the probe is more readily withdrawn from the liquid and is not swung so far downstream. Also, when solids such as rags, papers and the like, may be carried by flowing liquid they tend to wrap about a probe that becomes submerged by a rapidly rising liquid level. The tapered configuration of the probe 59a results in rags or the like slipping down the probe and off of the lower end as the probe swings somewhat from vertical by the side force thereon. Thus the probe is not unduly pulled away from the mechanism by water pressure against debris entangled with the probe.

The probe is formed at the top thereof to fit into the seal 55 to form a watertight connection when the probe is fully raised. This, together with the sealing relation of the cover 17 to the housing ensures complete watertightness so that even total immersion of the mechanism will not damage interior parts nor the chart 49. The probe 59 of FIG. 1 will be seen to fit entirely within the housing when fully retracted; however, elongated probes such as probe 59a of FIG. 1A will not fully fit in the housing and may, for example, be formed of separable sections so that the lower section or sections may be detached from a fully retracted upper section in the housing.

A normally closed up-limit micro-switch 62 is mounted with its actuating arm overlying the washer 57 on the resilient seal 55. When the probe 59 is drawn up into the seal 55, the action raises the washer 57 and actuates the switch 62 to open an electrical probe circuit, to be described in more detail hereinafter. A double pole, double throw "On-Off" or main switch 64, see FIGS. 2 and 3, is mounted on the top plate 23, as is also a push-button "Invert" switch 65 for lowering the probe 59 to the bottom. An electric battery 66, such as for example a rechargeable nickle-cadmium battery of suitable voltage, is mounted on the bottom plate 13.

A solid-state motor control module 68 is mounted on the bottom plate 13 and comprises a single transistor circuit 68a as shown schematically in FIG. 3, and described later herein.

As previously noted, one of the important and major applications of the present invention is the utilization of same for measuring the depth of water, sewage and other flowing liquids such as, for example, rainwater running through storm drains or trenches. The invention is highly advantageous in being fully operable without requiring operating personnel to physically enter the conduit, trench, or the like, carrying liquid. In the case of closed conduits, such as sewer lines, storm drains, and the like, there are normally provided vertical access openings commonly termed "manholes." The mechanism of the present invention is adapted for mounting adjacent the top of such manholes or, alternatively, across the top of open trenches so that only the probe depends from the mechanism into the conduit or trench to touch the liquid therein. With regard to mounting of the present invention in manholes, there is provided hereby a removable spring-biased mounting or support means, and alternative embodiments thereof are illustrated in FIGS. 4 and 5.

Figure 4:
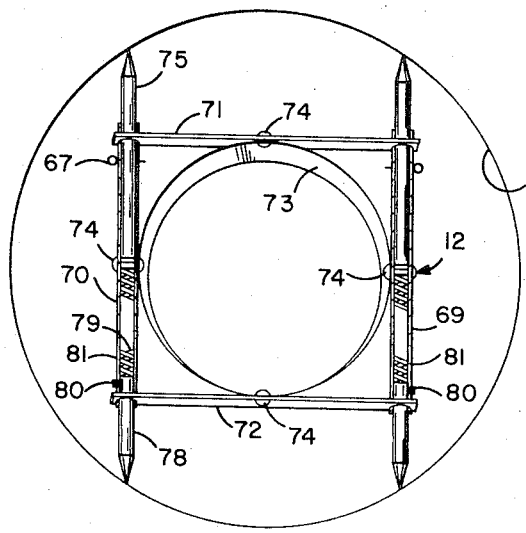
FIG. 4 is a top plan view of a support frame for removably mounting the mechanism of FIG. 1 in a manhole or the like, with the tubular side frame members of the mounting being shown in section.
Figure 5:
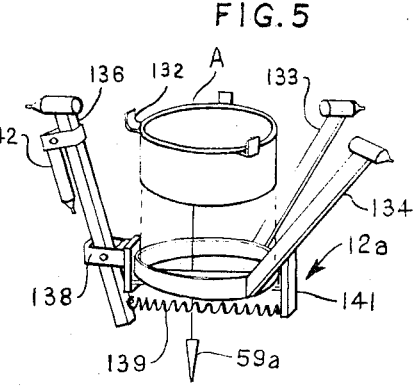
FIG. 5 is a schematic perspective illustration of an alternative removable mounting for the mechanism of FIG. 1.

Referring first to the embodiment illustrated in FIG. 4, it is noted that the mounting is generally denominated by the numeral 12, as employed in FIG. 1, and includes a pair of parallel tubular side frame members 69 and 70 secured in fixed relation to a pair of parallel transverse frame members 71 and 72, as by welding or the like. There is thus formed by these members a rectangular frame with the open ends of the tubular members exposed. An annular metal band or ring 73 for supporting the instrument A is mounted within and tangent to the tubular members 69 and 70 and transverse members 71 and 72 and is firmly secured to such members as, for example, by rivets 74.

In one end of each tubular side member a rod 75 pointed on its outer end is telescopically inserted and is anchored in axially adjusted position by a through pin 67. In the other end of each tubular side member a second pointed rod 78 is inserted for axial slidable movement and is biased axially outwardly by a coil spring 79 held in compression between the inner end of the rod 78 and a rivet 74. A limit stop pin 80 secured to extend from the side of each rod 78 and riding in a slot 81 provided therefor in its associated tubular side member, limits axially outward movement of the rod.

For mounting the support frame 12 in a manhole B, the points of the two spring-biased rods 78 are inserted in the open upper end of the manhole and placed against the bricks or the like lining the manhole a desired distance below the top. The installer, grasping the frame firmly, pushes it toward the spring-biased rods 78 to compress the springs 79 sufficiently to permit the frame to be swung to level position within the manhole. Upon releasing the frame, the springs 79 urge the frame in the opposite direction to force the points of the other rods 75 also into firm, supporting engagement with the opposite side of the manhole. The instrument A can then be seated within the annular support band 73 as shown in FIG. 1.

An alternative embodiment of support means labeled 12a in FIG. 5 also operates by spring pressure to engage the sides of a manhole or vertical opening into a conduit or the like containing a liquid whose level is to be measured. In common with the above described support means, the support 12a includes an annular manhole bracket or ring 131 into which the instrument A is adapted to be fitted for support of the instrument. In this instance, as well as that described above, side brackets 132 may be provided about the upper portion of the instrument so that as the housing 10 is slid into the bracket 131 these side brackets 132 will engage the annular bracket 131. A pair of arms 133 and 134 are fixed to the ring 131 in extension upwardly therefrom and outwardly therefrom in fixed relation to the ring. The arms 133 and 134 also extend away from each other upwardly of the ring, as generally indicated in FIG. 5. A third arm 136 is pivotally mounted on the ring 131 across from the arms 133 and 134 so that the three arms are disposed in somewhat of a triangular configuration. Pivotal mounting of the arm 136 may be accomplished by a bracket 137 secured to the ring and extending upwardly and outwardly therefrom, and the bottom of the arm 136 is connected to a tension spring 139, extending across beneath the ring 131 to a brace 141 secured to the opposite side of the ring 131 and depending therefrom. The outer ends of each of the arms are provided with pointed contact tips directed radially outward of the ring 131 above same. It will be seen that the spring 139 tends to pivot the arm 136 outwardly and thus the support means 12a may be readily inserted in a manhole, or the like, by placing the arms 133 and 134 against the side of the manhole with the arm 136 pivoted inwardly at the top against the force of the spring 139 and then allowing the arm 136 to pivot outwardly into forcible contact with the manhole wall, whereat same is maintained by the force of the spring 139. The instrument A is then placed in the ring 131 with the probe 59 depending through the ring.

Further with regard to the support means 12a, it is noted that the three-point contact with the walls of a manhole, or the like, are advantageous in firmly mounting the support means, even though the manhole walls may be irregular or out-of-round. In order to extend the capabilities of the support means 12a to mounting in manholes of substantially varying diameter, there may be provided an elongated pivotally mounted contact tip 142 on the pivotally mounted arm 136. This elongated contact or pressure tip 142 may be pivoted upwardly to extend radially outward of the ring 131 for mounting the support means under those circumstances wherein the manhole has a substantially greater diameter than can be readily accommodated by utilization of the normal contact point on the pivot arm 136. It is to be appreciated that in use the support means 12a is mounted so as to dispose the ring 131 in substantially horizontal position, so that the instrument A will be horizontally mounted above liquid whose level is to be measured thereby. It will be appreciated further that the support or contact arms 133, 134 and 136 may be extended either directly outwardly from the ring 131 or even may depend from the ring and extend outwardly therefrom. However, it has been found advantageous to form the three-arm support means of FIG. 5 in the manner illustrated, inasmuch as the contact points of the arms are then located near the top of the manhole so as to be readily positioned as desired, for securing the support means in the manhole. Normally, of course, the contact points are disposed sufficiently below the top of the manhole so that the manhole cover may be returned to position whereby the instrument of the present invention and the support means therefor are both entirely out of the way with regard to the surface above the conduit whose liquid level is to be measured. This is particularly advantageous in installations below the surface of streets inasmuch as the manhole cover may then be replaced so that the street is in no way obstructed by the presence of the instrument hereof measuring liquid level in conduits, or the like, below street level.

Considering now the operation of the instrument of the present invention together with a description of the circuitry thereof, reference is made to FIG. 3 of the drawings. It is assumed that the instrument A is mounted by the frame or support means 12 or 12a in a sewer manhole, for example, with a stream of liquid such as sewage 82 flowing in the sewer line at the bottom of the manhole. A ground wire 83 from the instrument is either lowered into the liquid 82, as indicated in FIG. 1, or alternatively is electrically connected to a steel manhole ladder 84 as may be provided in the manhole, so as to provide an earth ground for the circuit. It is also assumed that the double pole double throw "On-Off" switch 64 is initially in its "Off" position, as shown in dotted lines in FIG. 3, with the probe 59 in its fully raised position within the seal 55 to thus hold open the up-limit switch 62.

First with regard to the measurement of the invert or bottom point of the conduit, it is noted that same is normally determined to establish a zero reference level for readings to be recorded on the chart 49. The main "On-Off" switch 64 is first moved to its "On" position as shown in solid lines in FIG. 3 and since the probe 59 is out of contact with the sewage 82, and the slack-sensing switch 30 is held in its open position by the weight of the probe 59 on the cable 25, a bias is applied to the base of transistor 85 through conductors 87 and 88 and resistor 89 to turn on transistor 85, which in turn applies a triggering bias to the bases of transistors 90 and 91. This opens a motor-energizing circuit through these transistors 90 and 91 and conductors 92, 93, 94, 95, 96 and 97 to a negative or ground conductor 86 to lower the probe 59.

At some time before the probe 59 reaches the sewage 82, the normally closed push-button "Invert" switch 65 is depressed to open said switch, and is held depressed to prevent grounding of the probe circuit when the probe contacts the sewage. Thus when the probe 59 touches the sewage 82 it keeps right on descending until it is arrested by engagement with the bottom 120. Engagement with the bottom removes the weight of the probe 59 from the cable 25, which thereupon slackens and allows the slack-sensing switch 30 to close, grounding the module contact post 91' through conductors 92, 93 and 94. This applies a changed bridging bias to the base of transistor 85 which turns off the transistor. Simultaneously a bias is applied to the base of transistor 95 through resistor 97 and conductor 98, turning on transistor 95 which in turn applies a triggering bias to the bases of transistors 99 and 100 through conductors 87, 101, 102 and 103 and resistor 104 to complete a motor energizing circuit in the opposite or probe raising direction through conductors 107, 108, 95, 94, 109 and 110. However, as soon as the slack is removed from the probe cable 25 and before the probe 59 is actually raised from the bottom 120, the slack-sensing switch 30 is again opened to reverse the motor 18 and lower the probe. These successive reversals of the motor 18 caused by the alternate slackening and tautening of the cable 25 maintain the probe 59 right at the bottom or invert level.

When the invert level is thus established, the recording arm 40 is swung manually to zero recording position on the chart 49, frictional mounting of the recording arm 40 described previously herein permitting such movement. Then with the chart 49 rotatively adjusted in a usual manner to its required starting time position, the invert push-button switch 65 is released to allow a ground current to flow from the sewage 82 through the probe insert 60, cable 25 and conductor 94 to the module contact post 91', which causes the motor 18 to be driven in probe raising direction as described for the closing of the slack-sensing switch 30 as previously described herein. As soon as the probe 59 is raised clear of the sewage 82, the ground is thereby removed from the probe circuit and the motor circuit is thereby reversed to lower the probe as described previously herein for the opening and closing of the slack-sensing switch 30. These reversals of the motor circuit are repeated each time the plated lower tip of the probe insert 60 touches and leaves the stream of sewage 82, thus causing the probe tip to accurately follow and record all changes in sewage level in terms of depth, since the invert or zero level was established at the beginning of the run.

When the desired run has been completed, the main "On-Off" switch 64 is moved to its "Off" position as shown in broken lines in FIG. 3, thereby applying positive current from the battery 67 through conductor 112, normally closed up-limit switch 62, and conductor 113 to contact post 114 of the module 68. Simultaneously contact post 117 of the module is grounded through conductors 118 and 92. This triggers transistor 95 to close the probe-raising circuit through the motor 18 until the probe 59 enters the resilient seal 55 and raises the washer 57 to open the up-limit switch 62 and thereby open the circuit to positive battery thereby deactivating the entire circuit. The instrument A can then be lifted from its support frame 12 and said frame removed from the manhole by reversing the procedure set forth previously herein for its installation.

It is noted that the present invention is adapted for unattended use and, because of the very low power requirements of the instrument, is capable of operating for approximately 7 days upon a single battery charge. Of course the instrument is also adapted for connection to external power lines. The rate of movement of the probe of the instrument is adjustable and may, for example, be set to move at a rate of an inch per several seconds or alternatively may be set to move at a much more rapid rate if it is expected that rapid variations in liquid level must be measured. With regard to the actual measurement and recording by the present invention it is noted that the invention may be manufactured to measure different ranges of liquid level variation or liquid depth. The instrument may, for example, be produced to measure a range of 0 to 15 inches or possibly a range of 0 to 10 feet. Naturally the greater the range of the instrument the more cable that must be carried therein and under certain circumstances it is advantageous to employ a limited range instrument for measurement only of level variation without incorporating the capability of measuring the invert or bottom level of the liquid. Thus, for example, wherein it is known that the level of a 10 foot stream of liquid will only vary a maximum of 1 foot from an average depth an instrument having a range of 0 to 15 inches or 0 to 24 inches would be quite adequate for measuring the level variation. In this circumstance however, this initial or zero setting of the chart recorder would be handled on a somewhat different manner. If it could properly be assumed that the liquid level was at its average height, the instrument would then be operated to sense the location of the upper surface of the liquid and the arm 40b of the recorder would then be set in the middle of the range of the recorder. Subsequent variations about this average depth would then be charted by the invention.

In the circumstances wherein the present invention is employed in connection with the determination of flow of liquids it is of particular importance that the invention has the capability of stopping probe lowering at any time that the probe engages a solid object such as, for example, the bottom of a conduit or trench. For many flow measurement applications there will occur times when no liquid is flowing and, in fact, when the conduit or trench is entirely dry. Prior art devices are normally not capable of accommodating such a situation but the present invention automatically stops the lowering of the probe at any time that the probe touches the bottom, as the slack-sensing switch will then stop the unreeling of the cable. In the absence of this portion of the present invention the cable would unfortunately be entirely unreeled when no liquid was present in the conduit or trench under investigation and consequently loops of the cable would be laid out on the floor of the conduit. Such a condition is highly disadvantageous even if it does not harm the device because as fluid starts to flow in the conduit or trench the instrument would provide an erroneous reading until the cable had been reeled back enough to lift the probe.

The employment of a narrow and preferably tapered probe such as probe 59a illustrated in FIG. 1A, is highly advantageous in applications of the present invention to rapidly varying levels of flowing liquid. As previously noted, a sideways force is applied to a probe immersed in flowing liquid tending to move the probe downstream of the liquid. Thus by the provision of a probe having a very small cross section the amount of this force is minimized. Furthermore, the tapered configuration of the probe 59a is highly advantageous because solids such as paper, rags or the like, that may be carried by the flowing liquid and would possibly wrap around the probe at any time the liquid level is above the probe, would increase the surface area to be acted upon by the flowing liquid. This then would result in a greater sideways force being applied to the probe, tending to swing it downstream. With the tapered configuration of the probe 59a, any such debris such as rags, paper or the like, that might impinge upon the probe and, in fact, attempt to wrap itself thereabout, would be pushed toward the bottom of the probe by the flowing liquid itself so as to slip from the outer end of the probe and pass on downstream. This is particularly true when the probe is even slightly inclined from vertical.

It has been noted above that the present invention is highly advantageous in the determination of volume of liquid flowing in a conduit, trench or the like and yet it will be appreciated that the instrument of the invention actually only measures liquid depth and liquid level. In order to convert such measurements into flow rates there may be employed Manning's formula which correlates the parameters of conduit diameter, conduit inclination and depth of liquid in the conduit. Reference is made to standard engineering texts for an explanation of Manning's formula, and also corrections that may be employed for surface conditions of conduits carrying the flow to be measured. In practice, charts formed in accordance with Manning's formula are employed in connection with the readings obtained with the present invention to then provide a direct reading of the volume of flow. It is also possible to employ some type of calculator having the form, for example, like a circular slide rule upon which there is inscribed the parameters of Manning's formula so that direct calculations may be made to determine volume of flow without the necessity of referring to charts.

The invention provides a simple, compact and relatively inexpensive liquid level and depth recording mechanism and one which can be easily transported, stored, erected and serviced. In combination with its mounting frame it can be quickly and firmly installed in a manhole, the manhole cover replaced and the mechanism left to perform its required functions without attention for a desired period of time.

What is claimed is:

1. A device for measuring liquid level and adapted for mounting above liquid comprising, an insulated electrical cable wound about a rotatable reel, a reversible electrical motor connected to said reel for rotating the reel, an electrically conducting weighted probe connected to a free end of said cable and depending from the device, motor control means connected to said probe through said cable and connected to control said motor for operating the motor to raise the probe upon making of contact between probe and liquid and to lower the probe upon breaking of contact between probe and liquid, slack sensing means engaging said cable and connected to said motor control means for raising said probe upon slack sensing and lowering said probe in the absence of slack sensing, switching means connected between said motor control means and probe for alternatively operating said motor control means by said probe and slack sensing means for determining the invert level as well as the upper level, measuring means connected to said reel and continuously indicating the location of said probe, and a watertight housing about the reel, motor, motor control means, and measuring means with an opening in the bottom thereof through which said cable extends, a seal about said housing opening for engaging said probe in watertight relation thereto in fully raised position of the probe, and switching means responsive to probe engagement with said sealing means for deactivating said motor.

2. A device for measuring liquid level and adapted for mounting above liquid comprising, an insulated electrically conducting cable wound about a rotatable reel, a reversible electric motor connected to said reel for rotating the reel, an electrically conducting weighted probe connected to a free end of said cable to depend from the device, motor control means including transistor switching means connected between said motor and said probe for operating the motor to raise the probe upon making of contact between probe and liquid and to lower the probe upon breaking of contact between probe and liquid, slack sensing means engaging said cable and connected to said motor control means for raising said probe upon slack sensing and lowering said probe in the absence of slack sensing, switching means connected between said motor control means and probe for alternatively operating said motor control means by said probe and slack sensing means for determining the invert level as well as the upper level, and measuring means connected to said reel and continuously indicating the location of said probe.

3. The device of claim 2 further defined by said measuring means comprising a recorder having an arm movable with rotation of said cable reel, and clutch means connecting said recorder arm and said reel with stop means at recorder zero whereby said recorder arm moves to zero reading as cable unreels and then remains at zero reading by clutch slipping until the reel reverses direction.

4. The device of claim 2 further defined by said probe having an elongated inwardly tapering configuration from top to bottom and being formed of a heavy material to hang upright at the end of said cable.

5. A liquid level measuring device for use in conduits and the like comprising, a housing adapted for removable mounting above liquid, a flexible insulated electrically conducting cable wound upon a reel in said housing and adapted to extend from the bottom of the housing, a reversible electric motor connected to said reel in said housing for rotating the reel, motor control means including transistor switching means disposed in said housing and connected to said motor for controlling operation thereof, a weighted electrically conducting probe connected to the free end of said cable for lowering from said housing to contact liquid, an electrical circuit connected to said motor control means and adapted for electrical connection to said probe through said cable for energizing said motor control means to raise said probe upon contact thereof with liquid and to lower said probe upon breaking contact with liquid, slack sensing means engaging said cable and connected to said electrical circuit for energizing said motor to raise said probe upon sensing of cable slack and lowering said probe in the absence of cable slack, measuring means connected to said reel and continuously indicating and recording the position of said electrical probe, and control means switching said electrical circuit between connection to said probe and connection to said slack sensing means whereby the device records the top level of liquid and the bottom level of liquid.

6. A liquid level measuring mechanism for mounting over a body of liquid subject to changes in the liquid level thereof, said mechanism comprising an electrically conducting weighted probe, an electrically conducting cable suspending the probe from the mechanism and having a length sufficient to reach the liquid at its lowest level to be recorded, measuring means operatively connected to the probe and movable by the probe proportionately to up and down movements of the probe, means in the mechanism for raising the probe, means in the mechanism for lowering the probe, means responsive to the making of contact between the probe and the liquid for actuating the probe raising means, means responsive to the breaking of contact between the probe and the liquid for actuating the probe lowering means, a slack-sensing switch mounted in the mechanism and connected to be maintained in actuated condition when the cable is tensioned by the weight of the probe thereon, and to return to normal deactivated position when the cable is slackened by the removal of the weight of the probe from the cable, said slack-sensing switch being operatively connected to the means in the mechanism for raising and lowering the probe to raise the probe when the slack-sensing switch is in its normal condition, and an invert switch connected to deactivate the means responsive to making of electrical contact by the probe with the liquid and connecting the slack-sensing switch to the means responsive to breaking of electrical contact by the probe with the liquid, whereby operation of the invert switch causes the probe to be lowered to the bottom of the liquid for location of the invert of the conduit carrying the liquid.

7. A liquid level measuring mechanism as set forth in Claim 6 further defined by a removable mounting for said mechanism comprising a support frame having a central support for the mechanism and a plurality of more than two projections connected to and extending outwardly from said support, the outer end of each of said projections being spaced circumferentially from each other in a common plane for mounting the frame with a mechanism therein in an opening to a conduit carrying liquid whose level is to be measured, and at least one of said projections being spring-biased outwardly and manually movable radially inwardly for removable mounting of said mechanism in an opening to a conduit.

\* \* \* \* \*